INVENTORS
ALEXANDRE HOROWITZ
MARTINUS KOOY
BY
AGENT

April 3, 1951     A. HOROWITZ ET AL     2,547,163
PISTON ENGINE

Filed Oct. 20, 1948     2 Sheets-Sheet 2

INVENTORS
ALEXANDRE HOROWITZ
MARTINUS KOOY
BY

AGENT

Patented Apr. 3, 1951

2,547,163

UNITED STATES PATENT OFFICE 2,547,163

PISTON ENGINE

Alexandre Horowitz and Martinus Kooy, Eindhoven, Netherlands, assignors to Hartford National Bank and Trust Company, Hartford, Conn., as trustee Application October 20, 1948, Serial No. 55,548
In the Netherlands November 8, 1947

4 Claims. (Cl. 74—50)

Piston engines comprising one or more pistons and in which the stroke of the pistons is determined by a member mounted eccentrically on the main shaft, are known. In engines comprising a driving mechanism of this type, the pistons and the member mounted eccentrically on the main shaft mostly comprise pressure or contact surfaces which co-operate and slide over each other during operation of the engine.

It is plain that an engine of this type in which, consequently, there is no junction between the pistons on the one hand and the member determining the piston path on the other hand, can be reduced to practice only if the force acting upon the piston is constantly directed towards the main shaft or, in other words, if the co-operating surfaces are constantly pressure loaded. Since these surfaces slide over each other during operation of the engine, it is necessary for them to be well lubricated in accordance with the contact pressure. Since in view of a simple construction on the one hand and easy assembly and disassembly on the other hand, it is often impracticable to give these surfaces an unlimited size, the thrust per unit area may be high at high piston pressures, due to which the solution of the lubrication problem, also in connection with the often difficult accessibility of the contact surfaces, is not simple. Even in the case of perfect lubrication considerable losses due to friction may occur, notably if the contact surfaces are not processed to an extremely high degree of accuracy, by which the cost of manufacture is greatly increased.

As is known, these disadvantages can be avoided in a piston-engine comprising one or more pistons and in which the stroke of the pistons is determined by a member mounted eccentrically on the main shaft of the engine and of which one or more contact surfaces co-operate with one or more other contact surfaces coupled with the pistons in such manner that every two co-operating contact surfaces are parallel, by providing exclusively rolling parts between two co-operating contact surfaces. These rolling parts may be enclosed in a cage in such manner as to be able to travel only a limited distance between the contact surfaces, which distance may be determined by means forming part of the eccentrically arranged member.

In a suitable construction according to the invention all cages in which the rolling parts are contained are interconnected, and one or more of the members provided with the contact surfaces comprise means determining the path of the cage with rolling parts which is provided between these contact surfaces.

In a particularly suitable construction according to the invention all cages are interconnected by a member which is arranged eccentrically with respect to the main shaft and rotatable about the latter, and of which member the movement is moreover determined by a crank connection between this member and the other member which is mounted eccentrically on the main shaft and is rotatable about the latter.

In order that the invention may be clearly understood and readily carried into effect it will now be explained more fully with reference to the accompanying drawings, given by way of example.

Figure 1:
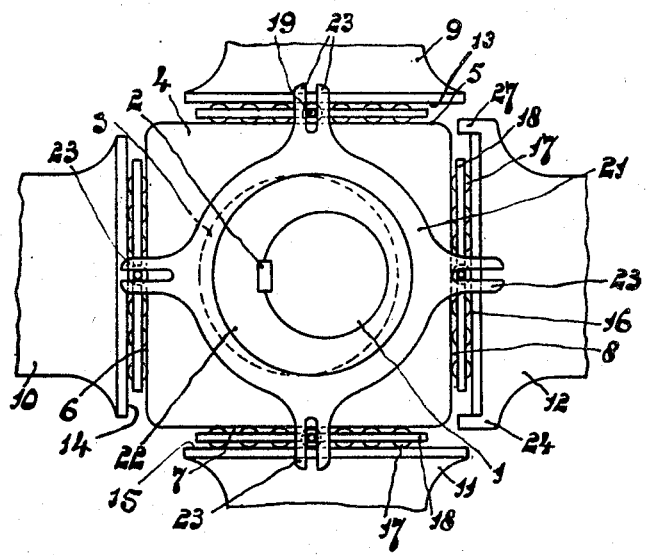
Fig. 1 shows a construction according to the invention, in which all cages are interconnected, and one contact surface comprises stops limiting the path of the rolling parts.

In Fig. 1 the reference numeral 1 denotes the main shaft which is driven or by which a tool is driven. An eccentric 3 is secured to this main shaft by means of a key 2. About this eccentric 3 is journalled a member 4 which exhibits four contact surfaces 5, 6, 7 and 8. Furthermore, the engine comprises four pistons 9, 10, 11, 12 exhibiting contact surfaces 13, 14, 15 and 16. A needle bearing comprising needles 17 provided in a cage 18, is provided between the co-operating contact surfaces 5 and 13. Such a needle bearing is also provided between the surfaces 6 and 14, 7 and 15, and 8 and 16. The cage 18 comprises a pin 19.

A member 22 is mounted eccentrically on the main shaft 1, with an eccentricity amounting to half that of the eccentric 3. A member 21 comprising four forked projecting parts 23 is rotatable about the eccentric 22. The pins 19 of the cages engage between the two teeth 23 of the said forks. One of the pistons 12 comprises stops 24, 27 limiting the path of the cage 18 with the rolling elements 17, so that at the end of the stroke any divergence is corrected. Since the cages containing the rolling elements are interconnected through the eccentric member 21 with forks 23, all cages with rolling elements are held in position.

Figure 2:
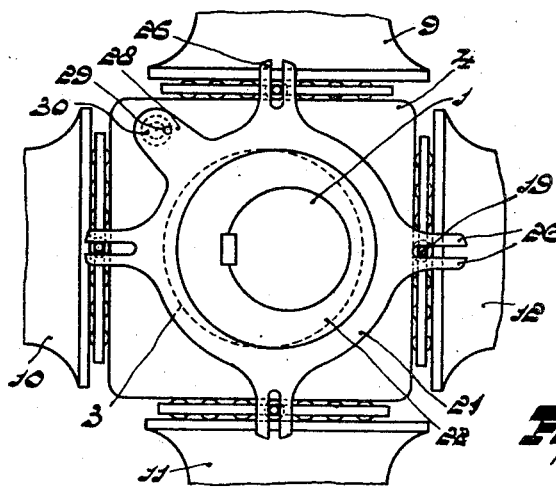
Fig. 2 shows another construction according to the invention, in which also all cages are interconnected, but the movement of the connecting member is determined by a crank connection.
Figure 3:
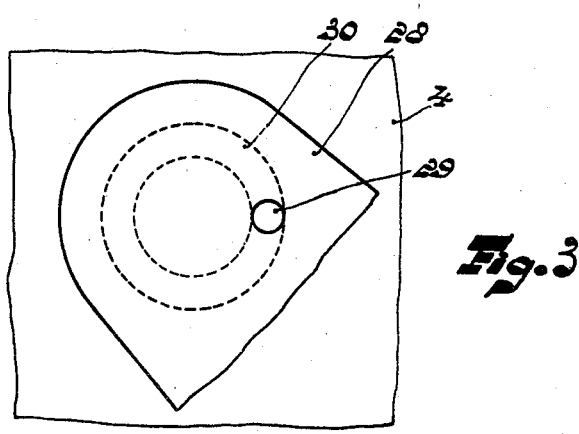
Fig. 3 is a detail view of the construction of the projecting part on member 21 shown in Fig. 2 on an enlarged scale.

Fig. 2 represents another construction according to the invention. In this construction the second eccentric member 22 is again provided as shown in Fig. 1, about which member the member 21 is journalled. In this case also the member 21 exhibits forks engaging about pins 19 secured to the cages. In this construction the member 23 comprises, moreover, a projecting part 28 (Fig. 3) which is provided with a pin 29. The eccentric member 4 is provided with a groove 30 accommodating the pin 29. The radius of this groove 30 corresponds to the eccentricity of the said members 21 and 22 and consequently to half the eccentricity of the member 4. In this manner, also, it is ensured that the cages 18 with rolling elements 17 are able to travel only the distance required for the rolling movement in both directions.

Figures 4A, 4B:
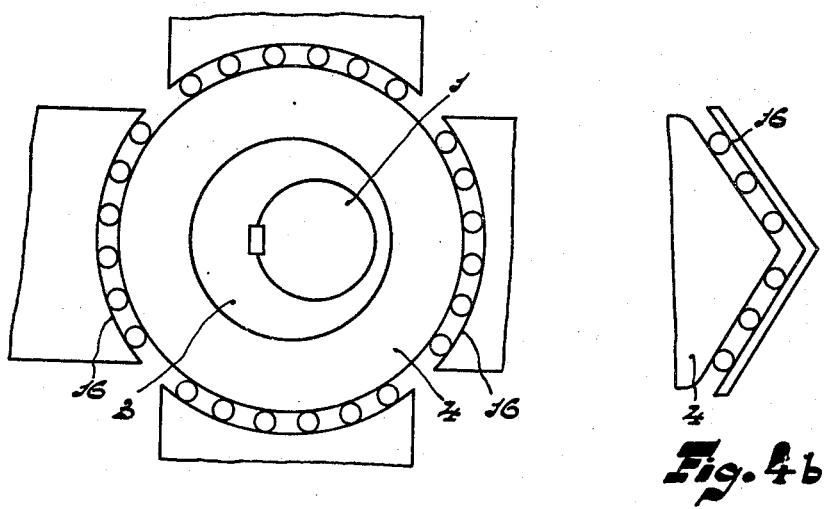
Figure 4a represents another form of the contact surfaces.
Figure 4b represents still another form of the contact surfaces. In the drawing corresponding parts bear the same reference numerals.

It is not necessary for the whole of the co-operating contact surfaces to extend in one plane, since constructions as shown in Figs. 4a and 4b are also possible.

It is only necessary that the co-operating contact surfaces should be prismatic and more particularly cylindrical surfaces of which the generatrix coincides with the direction of motion.

What we claim is:

1. A piston engine comprising a plurality of separately movable pistons; means for determining the stroke of each of said pistons, said means comprising; a main engine shaft, a member journalled eccentrically on said main shaft, said member having a plurality of contact surfaces, each of said pistons having a contact surface which is operatively associated and parallel with one of said contact surfaces of said member to form pairs of operatively associated contact surfaces, separate rolling means positioned between each pair of operatively associated contact surfaces and in rolling contact therewith, separate cage means confining each of said rolling means, common coupling means limiting the lateral movement of each of said cage means and the said rolling means confined thereby with respect to said operatively associated surfaces, said common coupling means being journalled on said main engine shaft.

2. A piston engine comprising a plurality of separately movable pistons; means for determining the stroke of each of said pistons, said means comprising a main engine shaft, a member journalled eccentrically on said main shaft, said member having a plurality of contact surfaces, each of said pistons having a contact surface which is operatively associated and parallel with one of said contact surfaces of said member to form pairs of operatively associated contact surfaces, separate rolling means positioned between each pair of operatively associated contact surfaces and in rolling contact therewith, separate cage means confining each of said rolling means, common coupling means limiting the lateral movement of each of said cage means and the said rolling means confined thereby with respect to said operatively associated surfaces, said common coupling means being journalled eccentrically on said main engine shaft, and crank movement connection means coupling said common coupling means to said eccentrically journalled member for determining the movement of said common coupling means.

3. A piston engine comprising a plurality of separately movable pistons; means for determining the stroke of each of said pistons, said means comprising; a main engine shaft, a member journalled eccentrically on said main shaft, said member having a plurality of contact surfaces, each of said pistons having a contact surface which is operatively associated and parallel with one of said contact surfaces of said member to form pairs of operatively associated contact surfaces, separate rolling means positioned between each pair of operatively associated contact surfaces and in rolling contact therewith, separate cage means confining each of said rolling means, common coupling means limiting the lateral movement of each of said cage means and the said rolling means confined thereby with respect to said operatively associated surfaces, said common coupling means being journalled eccentrically on said main engine shaft, and means mounted on one of said pistons for absolute limitation of the lateral movement of the one of the cage means associated therewith.

4. A piston engine comprising a plurality of separately movable pistons; means for determining the stroke of each of said pistons, said means comprising; a main engine shaft, a member journalled eccentrically on said main shaft, said member having a plurality of contact surfaces, each of said pistons having a contact surface which is operatively associated and parallel with one of said contact surfaces of said member to form pairs of operatively associated contact surfaces, separate rolling means positioned between each pair of operatively associated contact surfaces and in rolling contact therewith, separate cage means confining each of said rolling means, common coupling means limiting the lateral movement of each of said cage means and the said rolling means confined thereby with respect to said operatively associated surfaces, said common coupling means being journalled eccentrically on said main engine shaft, and pin and slot connection means coupling said common coupling means to said eccentrically journalled member for determining the movement of said common coupling means.

ALEXANDRE HOROWITZ.
MARTINUS KOOY.

REFERENCES CITED

The following references are of record in the file of this patent:

UNITED STATES PATENTS

| Number | Name | Date |
| --- | --- | --- |
| 908,605 | Olin | Jan. 5, 1909 |
| 1,190,949 | Philippe | July 11, 1916 |
| 2,366,237 | Clausen | Jan. 2, 1945 |
| 2,366,238 | Clausen | Jan. 2, 1945 |